US012359857B2

(12) United States Patent
Twohy

(10) Patent No.: US 12,359,857 B2
(45) Date of Patent: Jul. 15, 2025

(54) TEMPERATURE-CONTROLLED CONTAINER

(71) Applicant: Hussmann Corporation, Bridgeton, MO (US)

(72) Inventor: Raymond P. Twohy, St. Peters, MO (US)

(73) Assignee: Hussmann Corporation, Bridgeton, MO (US)

( * ) Notice: Subject to any disclaimer, the term of this patent is extended or adjusted under 35 U.S.C. 154(b) by 0 days.

(21) Appl. No.: 17/400,495

(22) Filed: Aug. 12, 2021

(65) Prior Publication Data

US 2022/0049885 A1 Feb. 17, 2022

Related U.S. Application Data

(60) Provisional application No. 63/065,957, filed on Aug. 14, 2020.

(51) Int. Cl.
*F25B 49/02* (2006.01)
*F25B 13/00* (2006.01)
(Continued)

(52) U.S. Cl.
CPC ............ *F25B 49/02* (2013.01); *F25B 13/00* (2013.01); *F25D 11/00* (2013.01); *F25D 29/003* (2013.01); *F25B 2313/02792* (2013.01); *F25B 2313/0292* (2013.01); *F25B 2313/0293* (2013.01); *F25B 2600/111* (2013.01)

(58) Field of Classification Search
CPC ...................... F25B 49/02; F25B 13/00; F25B 2313/02792; F25B 2313/0292; F25B 2313/0293; F25D 11/00; F25D 11/003; F25D 29/003; F25D 2400/12; F25D 2400/02; F25D 2700/12; F25D 2600/00
See application file for complete search history.

(56) References Cited

U.S. PATENT DOCUMENTS 5,009,081 A * 4/1991 Kruck ..................... F25D 11/00
62/449
5,561,986 A 10/1996 Goodall
(Continued)

FOREIGN PATENT DOCUMENTS

EP 2835078 A1 2/2015
EP 3571963 A1 11/2019
(Continued)

OTHER PUBLICATIONS

WO-2019135378-A1 English Translation (Year: 2019).*
(Continued)

*Primary Examiner* — Frantz F Jules
*Assistant Examiner* — Devon Moore
(74) *Attorney, Agent, or Firm* — Michael Best & Friedrich LLP

(57) ABSTRACT

A container including a housing defining a product space and including a refrigeration system. The refrigeration system is coupled to the container and is in communication with the product space to condition the product space. The refrigeration system is operably connected to each other and selectively conditions the product space in a low temperature mode and a medium temperature mode.

16 Claims, 11 Drawing Sheets

(51) Int. Cl.
*F25D 11/00* (2006.01)
*F25D 29/00* (2006.01)

(56) References Cited

U.S. PATENT DOCUMENTS

| | | | |
|---|---|---|---|
| 6,020,575 | A | 2/2000 | Nagle et al. |
| 6,028,293 | A | 2/2000 | Nagle et al. |
| 6,269,653 | B1 | 8/2001 | Katusa |
| 6,698,210 | B2 | 3/2004 | Ogura et al. |
| 6,751,963 | B2 | 6/2004 | Navedo et al. |
| 6,799,434 | B1 | 10/2004 | Hobbs, Jr. |
| 7,263,855 | B2 | 9/2007 | Meyer et al. |
| 8,353,167 | B2 | 1/2013 | Mcgann |
| 8,362,404 | B2 | 1/2013 | Emerich et al. |
| 8,474,274 | B2 | 7/2013 | Schalla et al. |
| 9,182,155 | B2 | 11/2015 | Crumlin et al. |
| 10,238,007 | B2 | 3/2019 | Tansley |
| 10,278,895 | B2 | 5/2019 | Chou et al. |
| 10,464,731 | B2 | 11/2019 | Grogan |
| 10,488,081 | B2 | 11/2019 | High et al. |
| 10,610,451 | B2 | 4/2020 | Gray |
| 10,618,692 | B2 | 4/2020 | Hori et al. |
| 10,627,157 | B1 | 4/2020 | Ruth et al. |
| 10,641,538 | B1 | 5/2020 | Tang et al. |
| 10,670,323 | B2 | 6/2020 | Alexander et al. |
| 10,704,822 | B2 | 7/2020 | Tansley |
| 11,530,849 | B2 * | 12/2022 | Spath ...................... F25D 19/00 |
| 2002/0194860 | A1 | 12/2002 | Goodman et al. |
| 2004/0226309 | A1 | 11/2004 | Broussard |
| 2006/0276768 | A1 | 12/2006 | Miller et al. |
| 2009/0058352 | A1 | 3/2009 | Lin |
| 2009/0158770 | A1 | 6/2009 | Cohrs et al. |
| 2010/0287963 | A1 | 11/2010 | Billen et al. |
| 2011/0247356 | A1 | 10/2011 | Krosse et al. |
| 2017/0131014 | A1 | 5/2017 | Farrar et al. |
| 2017/0213187 | A1 | 7/2017 | Choi et al. |
| 2017/0215620 | A1 | 8/2017 | Dade et al. |
| 2018/0058739 | A1 * | 3/2018 | Zou ........................ F25B 49/00 |
| 2018/0274843 | A1 | 9/2018 | Lombardo et al. |
| 2019/0003757 | A1 | 1/2019 | Miros et al. |
| 2019/0044360 | A1 | 2/2019 | Neeld |
| 2019/0145673 | A1 | 5/2019 | Hoffmann et al. |
| 2019/0218029 | A1 | 7/2019 | Petz et al. |
| 2019/0277552 | A1 | 9/2019 | Vu |
| 2019/0277561 | A1 | 9/2019 | Spath |
| 2019/0362577 | A1 | 11/2019 | Vigil |
| 2020/0045959 | A1 | 2/2020 | Hoffmann et al. |
| 2020/0077826 | A1 | 3/2020 | Chenier |
| 2020/0128991 | A1 | 4/2020 | Jessie |
| 2020/0132356 | A1 * | 4/2020 | Tang ...................... F25D 23/02 |
| 2020/0158414 | A1 | 5/2020 | Farlotti et al. |
| 2020/0202290 | A1 | 6/2020 | Lo et al. |
| 2020/0206729 | A1 | 7/2020 | Boraso et al. |
| 2020/0229645 | A1 | 7/2020 | Karsten et al. |
| 2020/0386465 | A1 * | 12/2020 | Martinez Alcantara ..................... F25B 13/00 |

FOREIGN PATENT DOCUMENTS

| | | | |
|---|---|---|---|
| WO | 2004104499 | A1 | 12/2004 |
| WO | 2014080197 | A1 | 5/2014 |
| WO | WO-2018151493 | A1 * | 8/2018 ......... B60H 1/00264 |
| WO | WO-2019071112 | A1 * | 4/2019 |
| WO | WO-2019135378 | A1 * | 7/2019 .............. F25B 1/005 |
| WO | 2019185700 | A1 | 10/2019 |

OTHER PUBLICATIONS

Examination Report issued from the Australian Patent Office for related Application No. 2021215298 dated Jun. 30, 2022 (9 Pages).

* cited by examiner

TEMPERATURE-CONTROLLED CONTAINER

CROSS-REFERENCE TO RELATED APPLICATION

This application claims priority to U.S. Provisional Patent Application No. 63/065,957, filed on Aug. 14, 2020, and entitled "Temperature-Controlled Container," the contents of which is hereby incorporated by reference in its entirety.

BACKGROUND

The invention relates to a temperature-controlled container, and more particularly, to a multi-temperature controlled container that conditions product to a desired temperature.

SUMMARY

The invention is generally directed to a container (e.g., a tote or a box) that is small, portable, and that can condition product at various temperatures (e.g., between 34° and 41° Fahrenheit, below 34° Fahrenheit, or at near-ambient temperatures). The container can be used to fulfill customer orders by storing product at a temperature for the product that will maximize product life or otherwise protect the product from a harsh environment. The container can be used with warehouse rack systems, pulling systems, and other facilities or fulfillment centers. In one example, the container holds a desired internal temperature without external connections for a set time, such as 2 hours. The set time may be shorter or longer (e.g., 24 hours, 48 hours, etc.). The container can sense when product is placed in the container and when product is removed, and the container can condition the product space based on product placement and removal (e.g., during transit from a store to a home or business).

In at least one aspect, the invention provides a container or box or tote that includes a vapor compression system to condition a product space in the container. The vapor compression system can include a micro-compressor, one or more valves, a condenser, and an evaporator. In some constructions, the condenser and/or the evaporator may be microchannel or other piping.

In an aspect of the invention, the container has a portable power system (e.g., a battery system) to sustain operation without external connection for a period of time without being charged.

In an aspect of the invention, the container is a multi-temperature container capable of conditioning product at different temperatures—freezing temperatures (e.g., a low temperature container), refrigerated temperatures (e.g., a medium temperature container), or at temperatures below ambient (e.g., a cooled container, such as those for wine or chocolate). An exemplary temperature range includes −10° Fahrenheit to 130° Fahrenheit.

In an aspect of the invention, the container includes a controller with electronics to control temperature and to connect to other devices (e.g., via wired or wireless connections, or a combination of connections).

In an aspect of the invention, the container includes a controller and memory that stores data related to the state of the container or use of the container.

In an aspect of the invention, the container includes a refrigeration system that has an automatic defrost of the evaporator. Such a defrost may be, for example, auto-sensing defrost such that the system will defrost based on inlet to outlet air or refrigerant temperatures. When running in low-temperature mode—the unit may run a dehumidification cycle prior to conditioning the space to the desired temperature range. Such a setup reduces the load and reduces ice formation on the evaporator. In another example, reverse flow defrost can be used to eliminate the need for an electric heater.

In an aspect of the invention, the container includes an electronic controller that facilitates a soft-start to minimize over-current concerns for the battery.

In an aspect of the invention, the container includes a controller that controls the flow of air through the container (e.g., via one or more fans).

In an aspect of the invention, the container includes geo-tracking capability and/or mobile or other wireless connectivity.

In an aspect of the invention, the invention provides a container including a housing that defines a product space and including a refrigeration system. The refrigeration system is coupled to the container and is in communication with the product space to condition the product space. The refrigeration system is operably connected to each other and selectively conditions the product space in a low temperature mode and a medium temperature mode.

In another aspect, the invention provides a facility including a plurality of containers. Each of the plurality of containers includes a housing defining a product space and a refrigeration system that is coupled to the container and that is in communication with the product space to condition the product space. The refrigeration system is operably connected to each other and is configured to selectively condition the product space in a low temperature mode and a medium temperature mode. Each of the containers also includes a control system that has a communication interface and configured to regulate a temperature of the product space. The containers are functionally and communicatively connected to the facility via the communication interface such that the containers can be individually controlled.

In another aspect, the invention provides a housing that defines a product space, a refrigeration system that is coupled to the container and in communication with the product space to condition the product space, and a control system. The control system is configured to modify a mode of the refrigeration system based on a desired temperature for the product space and to provide additional information regarding at least one status of the container.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For ease of description, some or all of the exemplary systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
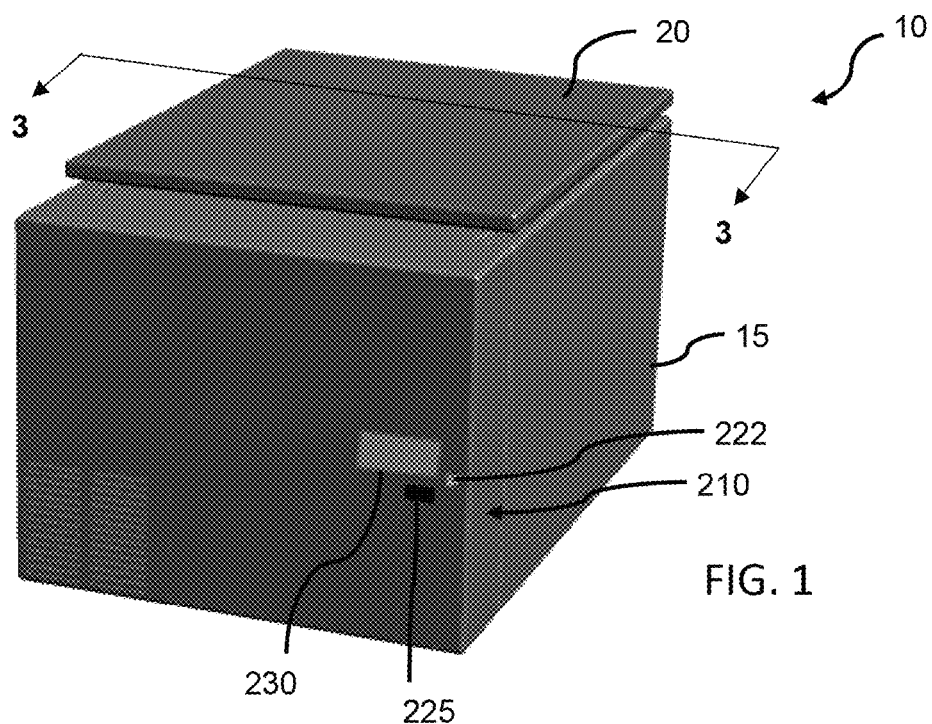
FIG. 1 is a perspective view of an exemplary container including a housing and a lid.
Figure 2:
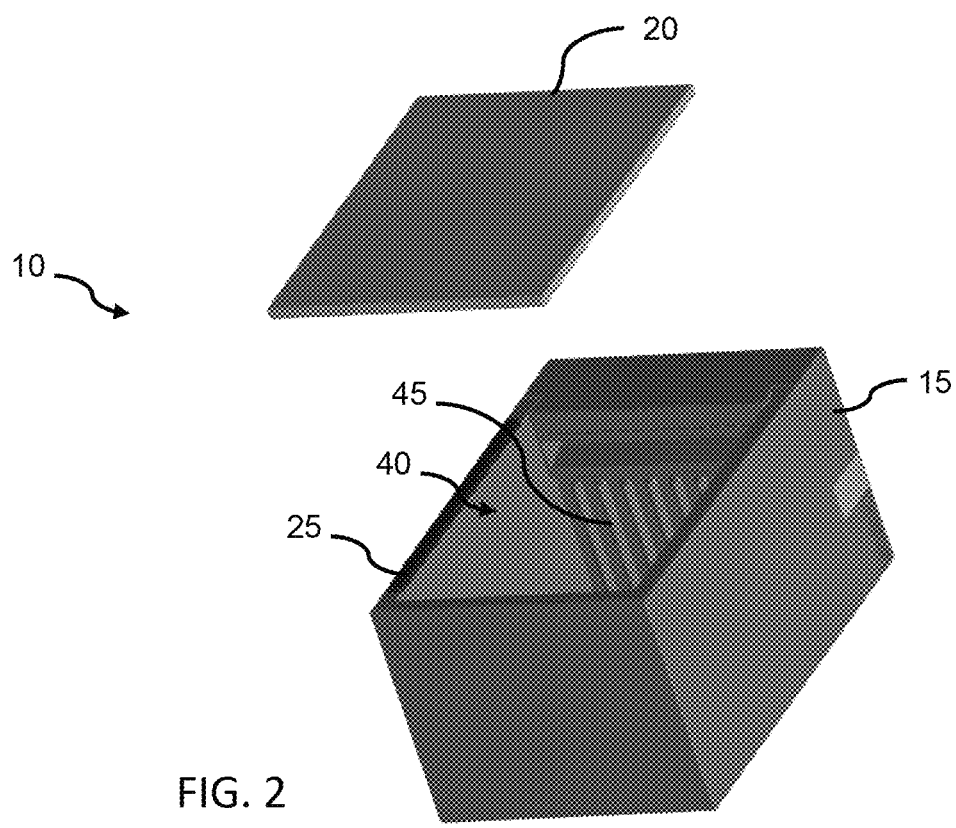
FIG. 2 is an exploded view of the container of FIG. 1.
Figure 3:
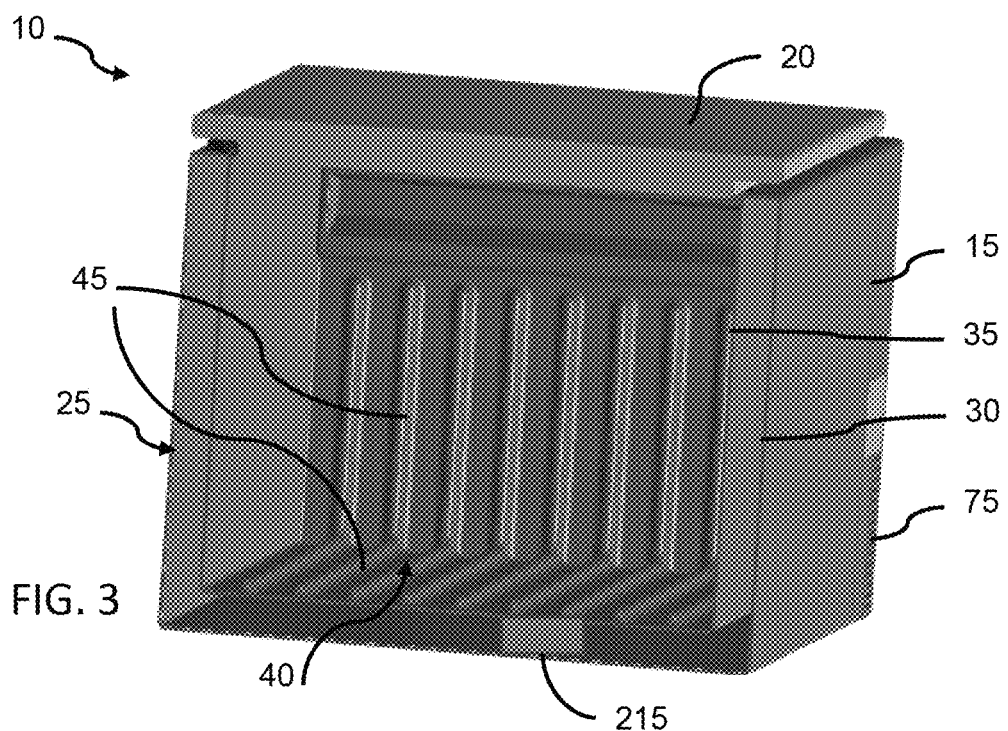
FIG. 3 is a section view of the container of FIG. 1, taken along line 3-3.

FIGS. 1-3 illustrate an exemplary container 10 that may be located in a supermarket, a fulfillment center, or another retail or commercial setting (e.g., referred to collectively as a 'facility' in the claims) to condition goods or product placed in the container 10. The container 10 includes a housing 15 and a lid or cover 20 that is attached to the housing 15. It should be appreciated that the container 10 may be referred to as a tote, a box, or other structure that stores and/or transports product.

The housing 15 defines an insulated box (e.g., a molded box) with a wall structure 25 that has an outer wall 30 and an inner wall 35 that is spaced from the outer wall 30. The wall structure 25 can take several forms. In one example, the wall structure 25 can be defined by a vacuum-insulated panel in which the space between the walls 30, 35 is generally at vacuum pressure (less than 14.7 PSIA), or in which material is provided in the space between the walls 30, 35 to insulate the housing 15. In another example, the wall structure 25 can be defined by foam injection, with a foam or similar insulative material injected into the space between the walls 30, 35. In yet another example, the wall structure 25 can be defined by one or more aerogel insulation blankets. In still another example, the wall structure 25 can be defined by a stainless steel vacuum-insulated system in which the space is placed in vacuum. In a further example, the wall structure 25 can include phase-change material. It will be appreciated that the wall structure 25 may include a hybrid of these examples (e.g., a wall structure 25 that is defined by vacuum-insulated panels with foam also injected into the space), or different insulative properties.

The inner wall 35 defines a product space 40 that supports product (e.g., food product, non-food product), and has ridges 45 on which product is supported so that air can flow around and under the product. In some constructions, the inner wall 35 may be provided without ridges. It should be appreciated that some or all of the ridges 45 do not need to extend continuously inside the product space 40.

The lid 20 may be attached to the housing 15 by an interference fit between a section of the lid 20 (see FIG. 3) that engages the inner wall 30. In some constructions, the lid 20 is attached to the housing 20 by a hinge. The hinge or the lid 20, or both, may include a lock feature (e.g., in the form of a notch) that restricts how far the lid can be opened. For example, the lock feature may restrict lid opening to an angle of 90° or less. In other constructions, the lock feature may restrict lid opening to 45° or less. In some constructions, a magnet or a lock can be used to hold lid closed (e.g., in hinged or non-hinged examples of the container 10).

Figure 4:
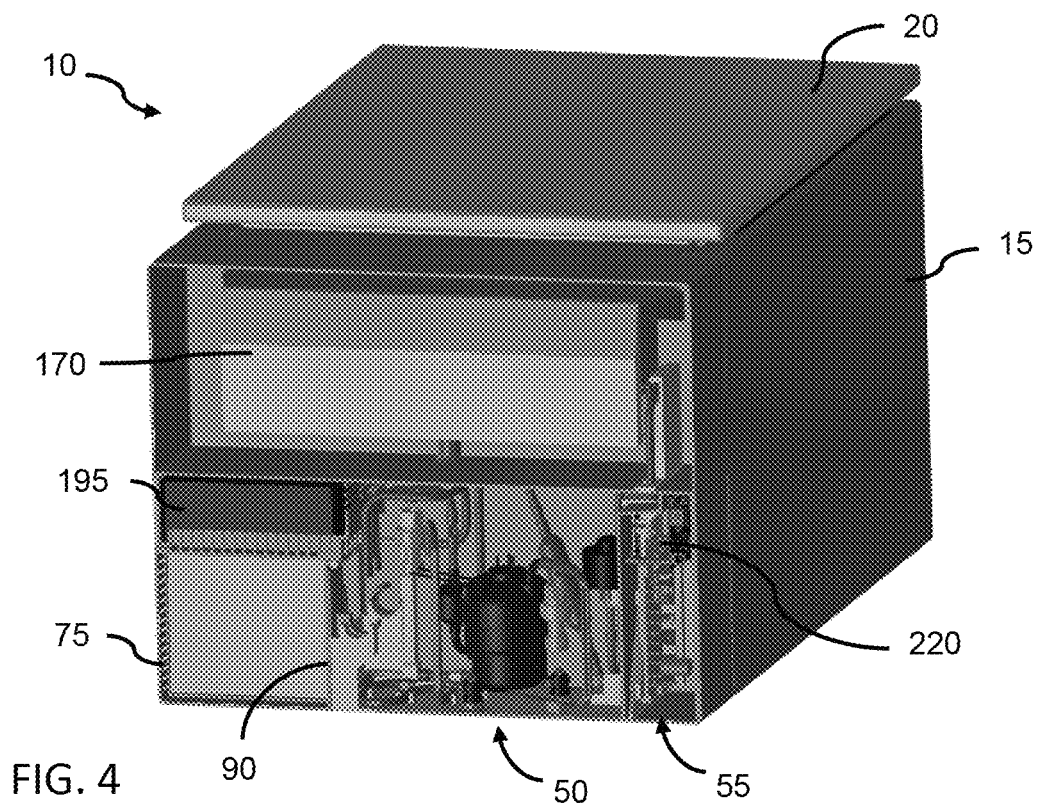
FIG. 4 is view of the container with portions of the housing removed to illustrate a refrigeration system and a control system.
Figure 5A:
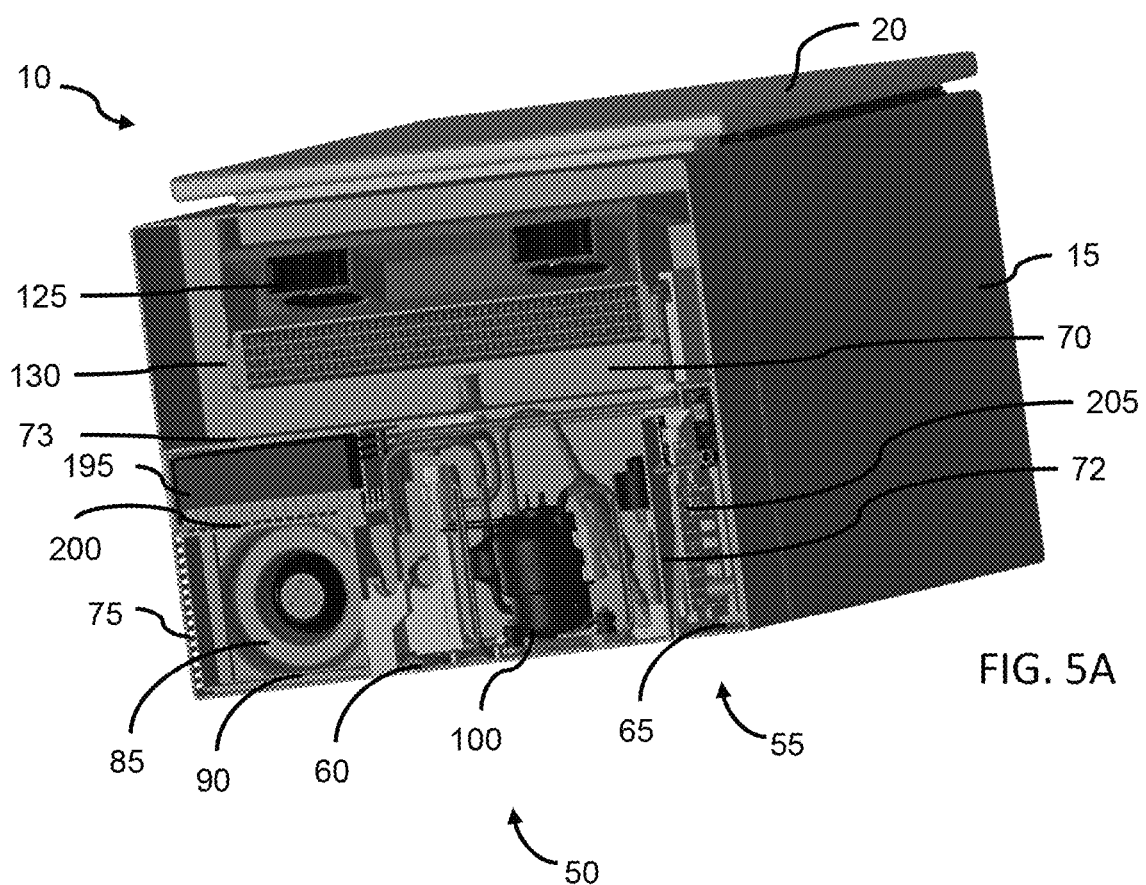
FIG. 5A is another view of the container with portions of the housing removed to illustrate aspects of the refrigeration system.

With reference FIGS. 4 and 5A, the housing 15 supports a refrigeration system 50 and a control system 55 to regulate the temperature of the product space 40 and to provide control of, or information about, other aspects of the container 10. The illustrated housing 15 has an end with a first compartment 60, a second compartment 65, and a third compartment 70 that support the refrigeration system 50 and the control system 55. The second compartment 65 is separated from the first compartment 60 by a first plate 72, and the third compartment 70 is isolated from the first and second compartments 60, 65 by a second plate 73. It will be appreciated that the quantity of compartments provided in the housing 15 may differ or otherwise vary depending on the design of the housing 15 and requirements of the systems (e.g., segregation of the control system 55 from the refrigeration system 50, or other components, airflow, etc.). As best seen in FIGS. 1, 3, 5A, and 5B, the housing 15 has an air intake 75 and an air exit 80 to facilitate airflow through the first compartment 60 and the third compartment 70.

The illustrated refrigeration system 50 is a reversable vapor compression system that can be used to condition the product space 40 at a wide range of temperatures (e.g., −10° Fahrenheit to 130° Fahrenheit, or temperature ranges between these two values). As shown, the refrigeration system 50 is supported in the first and second compartments 60, 65. The portion of the refrigeration system 50 in the first compartment 60 includes a blower fan 85 that is positioned in a fan housing 90, an accumulator 95, a compressor 100 (e.g., a micro-compressor), one or more pressure transducers 105 (e.g., to monitor superheat in the refrigeration system 50), a condenser 110, an expansion valve 115 (e.g., an electronic expansion valve), and a reversable valve 120. The first compartment 60 may support other components of the refrigeration system 50 (e.g., filter dryer 122, etc.), or components of other systems.

Referring to FIGS. 5A-7, the portion of the refrigeration system 50 that is supported in the second compartment 70 includes fans 125 (two are shown, although fewer or more fans may be included) and a heat exchanger or evaporator 130. The illustrated fans 125 are supported by respective fan brackets 135 that have openings 140 to permit airflow through the fans 125. The illustrated evaporator 130 is a fin-and-tube evaporator, although other types of evaporators may be used (e.g., microchannel). The evaporator 130 is coupled to the housing 15 on a shelf or ledge 145. The housing 15 further defines air inlets 150 and air outlets 155 that fluidly communicate with the product space 40. The air inlets 150 provide fluid communication between the product space 40 and the fans 125 via an inlet air chamber 160 that is located upstream of the fans 125. The air outlets 155 provide fluid communication between the evaporator 130 and the product space 40 via an outlet air chamber 165 that is downstream of the evaporator 130. A guide plate 170 is coupled to the housing 15 adjacent the air inlet side of the evaporator 130 to direct airflow from the fans 125 to the evaporator 130. A drain trap 175 can be positioned in or defined by the housing 15 to direct fluid (e.g., condensed water) away from the evaporator 130. Piping interconnects various components of the refrigeration system 50 to circulate refrigerant or coolant therethrough.

Figure 5B:
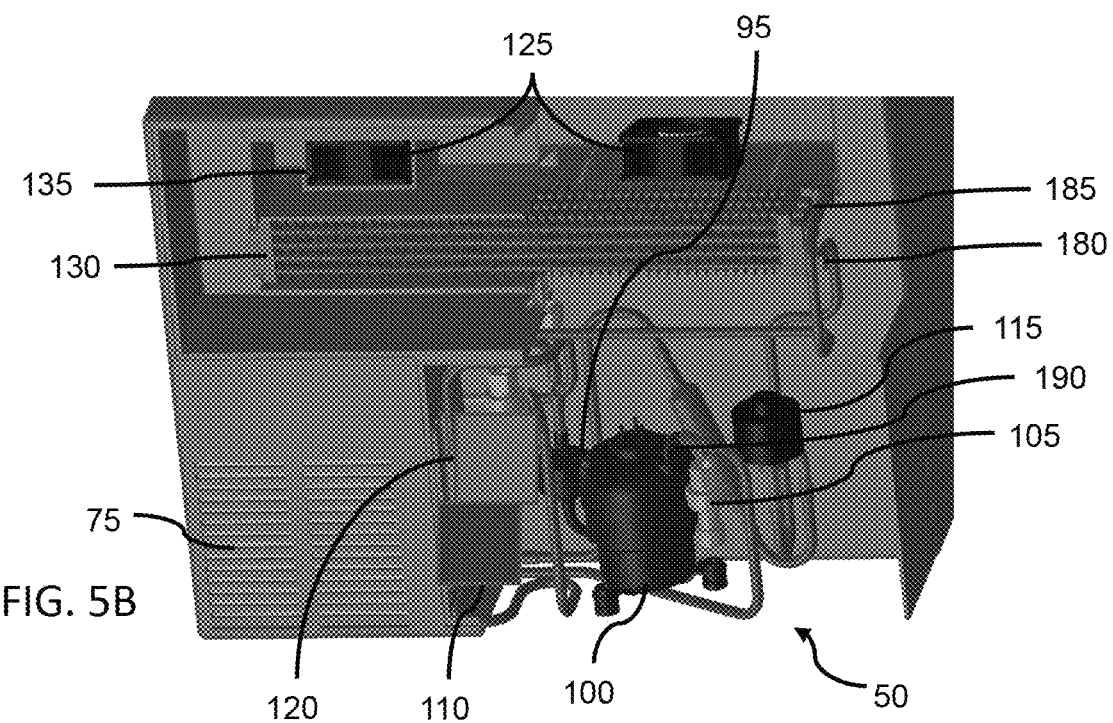
FIG. 5B is another view of the container with portions of the housing removed to illustrate aspects of the refrigeration system.
Figure 6:
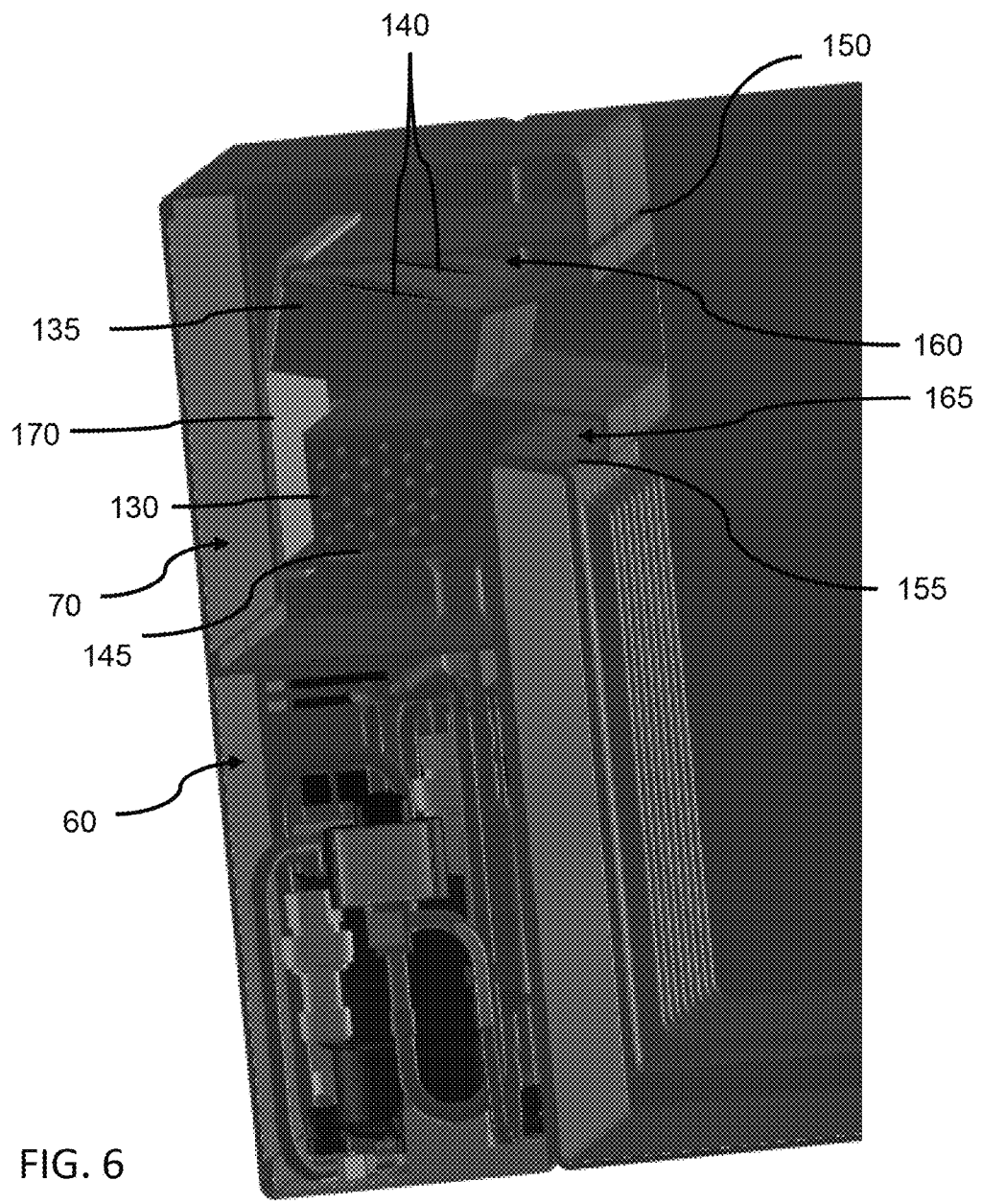
FIG. 6 is an enlarged view of a portion of the refrigeration system illustrating a conditioned airflow directed to the product space.
Figure 7:
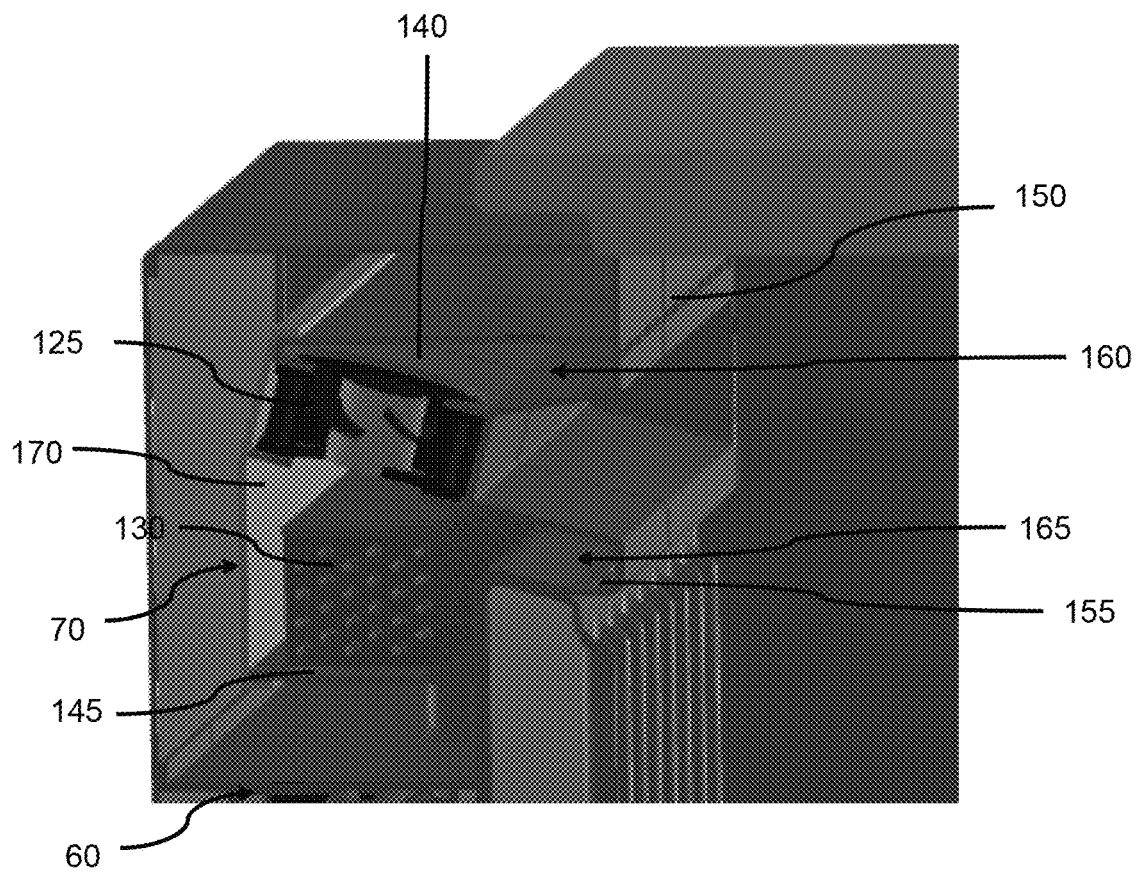
FIG. 7 is another enlarged view of a portion of the refrigeration system illustrating the conditioned airflow directed to the product space.

Referring primarily to FIG. 5B, the evaporator 130 has a refrigerant inlet 180 that is fluidly connected to the expansion valve 115, and a refrigerant outlet 185 that is fluidly connected to the reversable valve 120. The reversable valve 120 is fluidly connected to an inlet of the condenser 110. The compressor 100 has an outlet 190 that is connected to piping to facilitate water condensation along the bottom of the first compartment 60 before connecting to the reversable valve 120. An outlet of the condenser 110 connects to the expansion valve 115 via additional piping.

As shown in FIGS. 4 and 5, a power source 195 (e.g., a battery or battery pack) is positioned above the fan housing 90 in a battery compartment 200 that is in airflow communication with the fan housing 90. The power source 195 powers components of the container 10, including components of the refrigeration system 50 and the control system 55. The power source 195 is configured to be rechargeable. Such recharging can be done by a direct connection to an AC power source, or in other ways. For example, the power source 195 may be charged using an inductive charger. Such a charger can be placed adjacent the lid 20 above the compartments 60, 65, 70, or elsewhere, such as in the compartment 60 so that moisture may be evaporated from heat generated by the charger. In embodiments where the container 10 can be charged via a wired connection, and is being charged by the wired connection, the wireless charger (inductive charger, or other wireless charger) may be shutdown.

Figure 8:
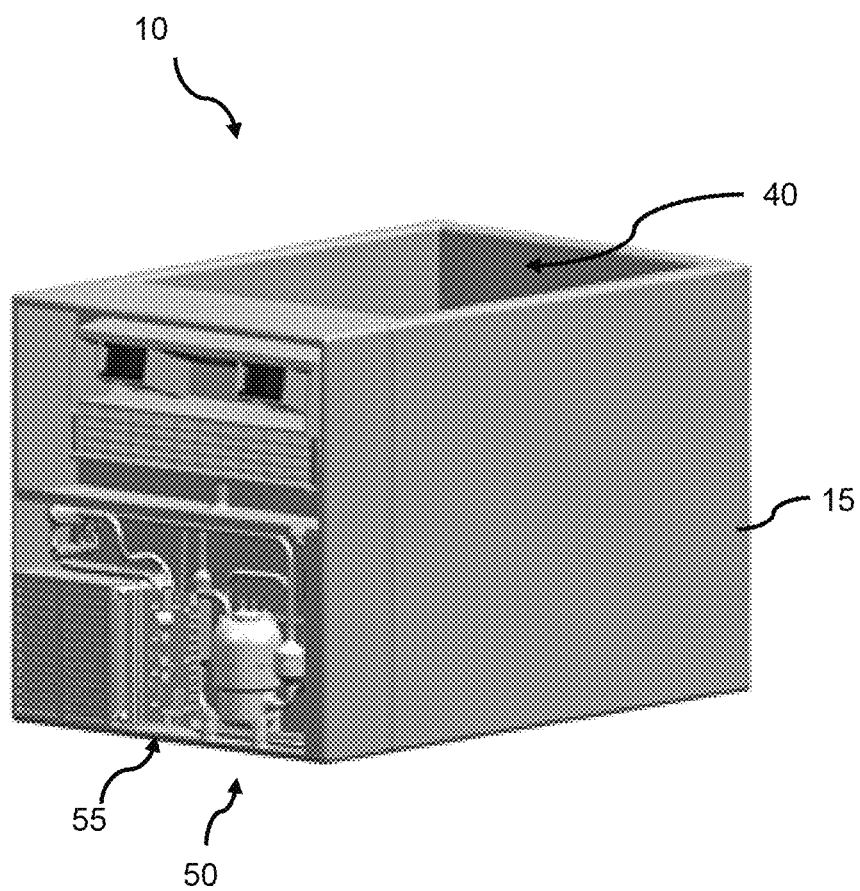
FIG. 8 is a perspective view of the container of FIG. 1 illustrating a different location for the control system.

With reference to FIGS. 4 and 5A, the control system 55 is located in and supported by the third compartment 70 and is in airflow communication with the first compartment 60 via perforations or openings in the first plate 72. As shown in FIG. 8, the control system 55, or a portion of the system 55, may be mounted to the fan housing 90. The control system 55 includes a controller 205 that is electrically and/or communicatively connected to a variety of modules or components of the container 10. For example, the controller 205 is connected to the refrigeration system 50 to control operation of the refrigeration system 50 and the power source 195, as well as to a user interface 210 and one or more sensors 215 associated with or integrated in the container 10.

In some embodiments, the controller 205 includes a plurality of electrical and electronic components that provide power, operational control (e.g., the blower fan 85, the compressor 100, the fans 125, etc.), and protection to the components and modules within the controller 205 and the container 10. For example, the controller 205 includes, among other things, an electronic processor (for example, a microprocessor or another suitable programmable device) and a memory 220. The memory 220 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor is communicatively coupled to the memory 220 and executes software instructions that are stored in the memory 220, or stored on another non-transitory computer readable medium such as another memory or a disc. The software may include one or more applications, program data, filters, rules, one or more program modules, and other executable instructions. The electronic processor also may store threshold crossing events or a type of threshold or other parameter that is associated with the container 10, the refrigeration system 50, or the power source 195 (e.g., temperature of the product space 40, parameters associated with the refrigeration system 50 (setpoints, state of the system 50, etc.), electrical thresholds such as power remaining in the power source 195, etc.). The electronic processor 220 may store the type of the threshold or parameter, a time of an event (e.g., when a product is placed or removed from the container 10, when a threshold is reached or crossed, etc.), and other factors. Such factors include data logging during operation or use of the container 10 (e.g., continuous data logging for a period of 24 hours, or another period of time). In some embodiments, the memory 220 can store information until a wired or wireless connection is established between the container 10 and another device (e.g., a server, a mobile phone, a laptop, etc.).

The controller 205 includes a communication interface that facilitates communications with one or more external devices and/or networks (e.g., wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). The communication interface can be or include wired or wireless communications interfaces (e.g., jacks, antennas, transmitters, receivers, transceivers, wire terminals, etc.) for conducting data communications between the container 10 and one or more external systems, networks, or devices. In some embodiments, the communication interface is a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRa, LoRaWAN, Near Field Communication (NFC), Radio Frequency Identification (RFID), Z-Wave, 6LoWPAN, Thread, WiFi-ah, and/or other wireless communication protocols. Additionally, the communication interface may include wired interfaces such as Universal Serial Bus (USB), USB-C, Firewire, Lightning, CAT5, universal asynchronous receiver/transmitter (UART), serial (RS-232, RS-485), or other interfaces that facilitate communication. Such connections can facilitate remote-control of one or more aspects of the container 10 (e.g., the refrigeration system 50) via an application on a mobile phone or another device.

The user-interface 210 is configured to output information regarding the container 10 and to facilitate control of the container 10 (e.g., the refrigeration system 50 and the control system 55). In some embodiments, the user-interface 210 includes indicators (for example, LEDs) located on the exterior that may show the status of the container 10 (e.g., battery status or charge remaining), whether the product space 40 is within a desired temperature range, etc.). The user-interface 210 may also include an input/output device (e.g., connection 222) for connection to a laptop or another device (e.g., for data retrieval or container diagnostics).

The user-interface 210 shown in FIG. 1 includes a display 225 for displaying information regarding the container 10 (e.g., battery status, temperature, etc.), and a user control 230. The display 225 may have a touch-screen or other input devices (e.g., knobs, dials, switches, buttons, etc.). The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

The user control 230 can be an on/off control for the container 10 (e.g., for starting or stopping the refrigeration system 50). In some constructions, the user control 230 can include a mechanism for servicing or troubleshooting the container 10. In other constructions, the on/off control and the servicing troubleshooting may be provided separately. The user control 230 may take the form of a toggle switch (e.g., a three-position switch, a pushbutton, or another form that facilitates control of the container 10. In some embodiments, the user-interface may include additional indicators.

The sensors 215 sense one or more characteristics of the container 10. For example, one or more of the sensors 215 (when plural sensors are provided) may include a pressure transducer to detect whether a product has been placed in or removed from the container 10. Alternatively or in addition, the sensor 215 can take the form of a RFID tag that can facilitate detection of product placement or removal. In embodiments with RFID tags (e.g., mounted to product), the container 10 may further use such information on the RFID tag to automatically determine the desired temperature or temperature range for the product (e.g., a smart-container that determines whether a low temperature (LT) or a medium temperature (MT) range is desired). It will be appreciated that other sensors can be used to determine product placement or removal. One sensor 215 may be coupled to the power source 195 for continuous or periodic monitoring of a state of the power source (e.g., temperature monitoring, power status level, etc.).

In operation, the blower fan 85 is engaged to circulate air through the battery compartment 200 and the first and second compartments 60, 65 to cool the power source 195, components of the refrigeration system 50, and the control system 55 (via the opening(s) in the first plate 72). Air is drawn into the air intake 75 and leaves the container 10 via the air exit 80. In some embodiments, the blower fan 85 can be reversed. Such reversal may be desirable to remove debris from the condenser.

The refrigeration system 50 operates to condition the product space 40 to the desired temperature or temperature range. Air flows through the air inlets 150 and the inlet air chamber 160 via operation of the fans 125. The fans 125 push air toward and through the evaporator 130 (along the guide plate 170), where the air is conditioned by the evaporator 130. The conditioned air then flows through the outlet air chamber 165 and the air outlets 155 back into the product space 40.

The refrigeration system 50 is designed to condition the product space 40 at a wide range of temperatures so that product may be kept frozen, maintained in a cold, non-frozen state, or held at a higher temperature (e.g., above 41° Fahrenheit). The refrigeration system 50 can switch between different temperature modes or operations based on the desired product range for the product(s) placed in the container 10. These temperature modes include freezing temperature mode ("IC mode", e.g., for ice cream and similar products, in a range of approximately negative 12 (−12) degrees Fahrenheit to approximately negative 5 (−5) degrees Fahrenheit), low temperature mode ("LT mode", e.g., in a range of approximately negative 5 (−5) degrees Fahrenheit to approximately 5 degrees Fahrenheit), medium temperature mode ("MT mode", e.g., in a range of approximately 29 degrees Fahrenheit to approximately 41 degrees Fahrenheit), non-critical temperature or cool temperature mode ("cool temperature mode", e.g., for fruit, floral, or other product negatively susceptible to temperatures above 75 degrees Fahrenheit (like chocolate), in a range of approximately 41 degrees Fahrenheit to approximately 71 degrees Fahrenheit), and hot or high temperature mode (e.g., "high temperature mode", e.g., in a range of approximately 135 degrees Fahrenheit to approximately 145 degrees Fahrenheit). Each temperature mode described herein can be referred to as a temperature operation of the refrigeration system 50.

Such switchability can be facilitated by the control system 55 remotely or at the container 10, and such switchability can include switchover or a change in the speed of the fans 125 (via smart control). In addition, the refrigeration system 50 can be reversed (via the reversable valve 120) so that the system 50 acts as a heat pump to heat the product space (e.g., for achieving higher, hotter temperatures (up to about 130° Fahrenheit) for product that is desired to be kept hot). The airflow entering the product space 40 is circulated in part by the initial downward flow of conditioned air from the air outlets 155 along the ridges 45 (i.e. in the channels defined between adjacent ridges 45), along the bottom of the product space 40 below product, and upward alongside the product (e.g., anywhere in the product space 40), and toward the air inlets 150. Continuous or periodic circulation of conditioned air keeps product in the product space 40 at the desired temperature for a period of time (e.g., 2 hours, 12 hours, 24 hours, etc.). In general, the container 10 does not require a temperature-controlled room to function at the desired temperature mode. Instead, the refrigeration system 50 controls the temperature of the product space in the container 10 over a wide range of temperatures that may be fine-tuned by a user using the control system 55.

Figure 9:
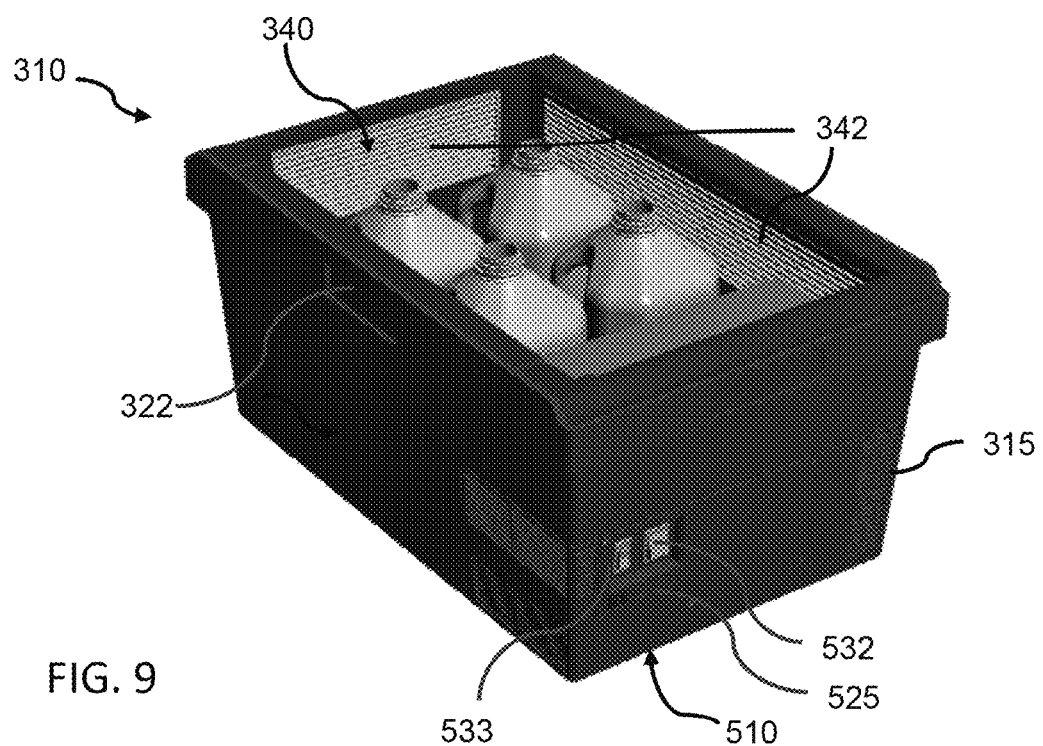
FIG. 9 is a perspective view of another exemplary container including a product space, a refrigeration system, and a control system.
Figure 10:
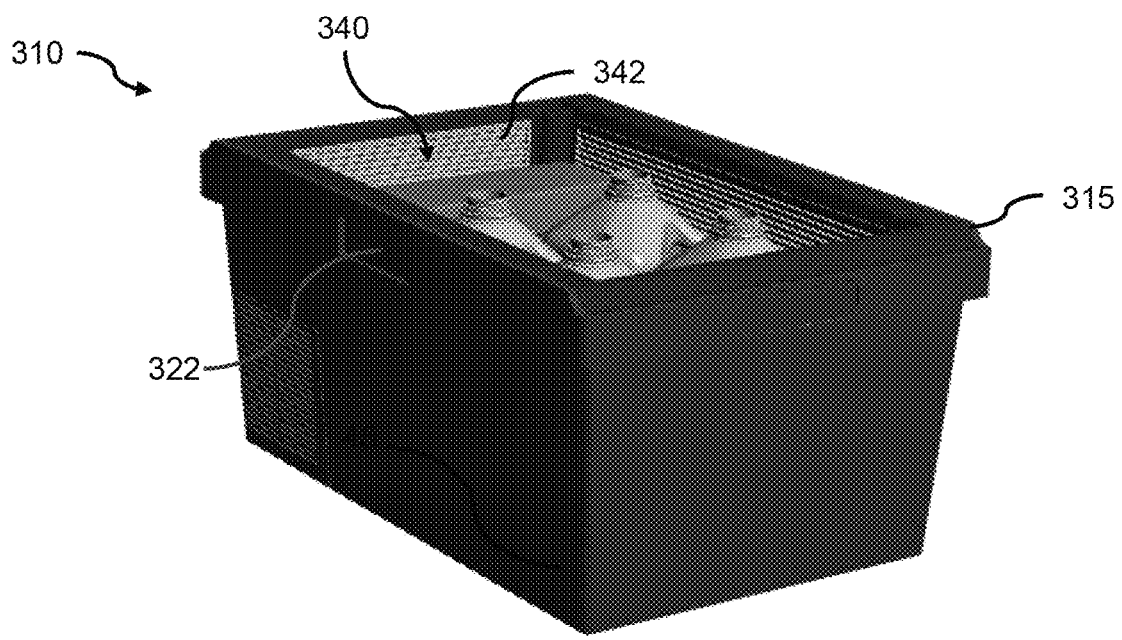
FIG. 10 is another perspective view of the container of FIG. 9.
Figure 11:
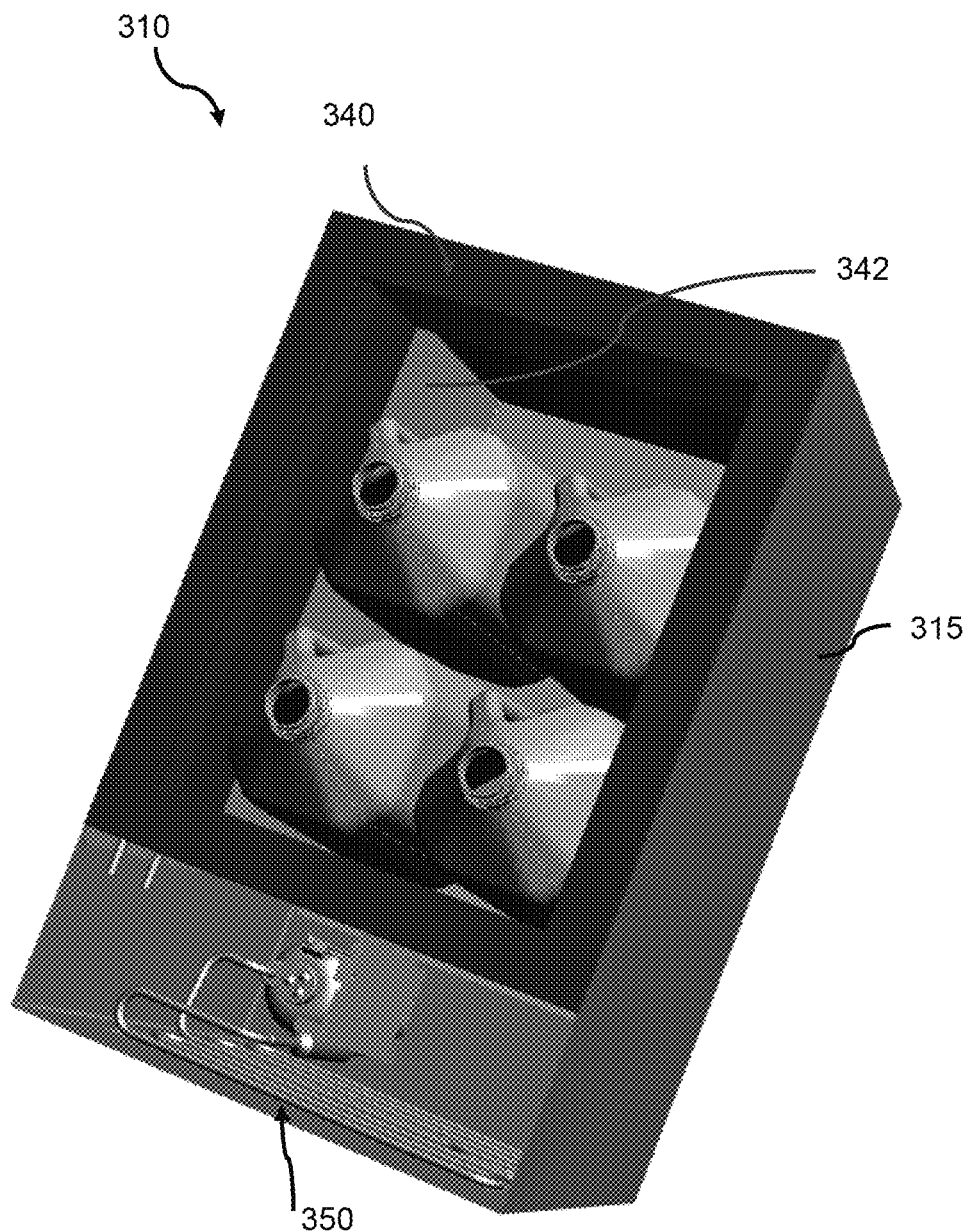
FIG. 11 is a perspective view of another exemplary refrigeration system for the container of FIGS. 9 and 10.

FIGS. 9-11 illustrate another exemplary container 310 that may be located in a supermarket, a fulfillment center, or another retail or commercial setting to condition goods or product placed in the container 310. The container 310 is similar to the container 10 and can include any or all of the features of the container 10, even if not specifically labeled or illustrated in FIGS. 9-11. Features that are the same or consistent with those described and illustrated relative to FIGS. 1-8 are numbered in the 300s, 400s, and 500s in FIGS. 9 and 10.

The container 310 includes a housing 315 that defines an insulated box (e.g., a molded box) with handles 322 and a wall structure 325 that can take one of the several forms described with regard to FIGS. 1-8. A product space 340 supports product (e.g., food product, non-food product), and conditioning plates 342 are attached to sides of the product space 340. The illustrated conditioning plates 342 are ribbed or non-planar to increase thermal transfer to product in the product space 340. The housing 315 supports a refrigeration system 350 that has one or more evaporators 430 positioned behind the conditioning plates 342 to condition the product space 340. FIGS. 9 and 10 illustrate that the refrigeration system 350 includes one or more microchannel evaporators, and FIG. 11 illustrates that the refrigeration system 350 includes a fin-and-tube evaporator.

A control system 355 is positioned in or on the container 310 to regulate the temperature of the product space 340 and to provide control of, or information about, other aspects of the container 310 in a manner that is consistent with how the control system 55 controls and provides information about the container 10. With reference to FIG. 9, the control system 355 includes a user-interface 510 is configured to output information regarding the container 10 and to facilitate control of the container 310. In some embodiments, the user-interface 510 includes indicators (for example, LEDs) located on the exterior that may show the status of the container 310 (e.g., battery status or charge remaining), whether the product space 340 is within a desired temperature range, etc.). As shown in FIG. 9, the user-interface 510 includes a display 525 for displaying information regarding the container 310 (e.g., battery status, temperature, etc.), and a user control 530. The user control 530 has an on/off control 532 and a refrigeration system control 533. The on/off control 532 can turn the container 10, including the refrigeration system 350 and the control system 355, on or off. The refrigeration system control 533 can be, for example, a switch that can switch the refrigeration system 350 between IC temperature mode, low temperature mode, medium temperature mode, cool temperature mode, and high temperature mode consistent with what is described with regard to FIGS. 1-8.

Operation of the container 310 is substantially similar to operation of the container 10. Notable differences include how the product space 340 is conditioned. More specifically, the refrigeration system 350 operates to circulate refrigerant through the evaporator 430. The conditioning plates 342 are in heat transfer relationship with the evaporator 430 (e.g., direct contact), and heat is transferred between the conditioning plates 342 and the evaporator 430. The direction of heat transfer depends on the desired temperature range for the product space 340.

Figure 12:
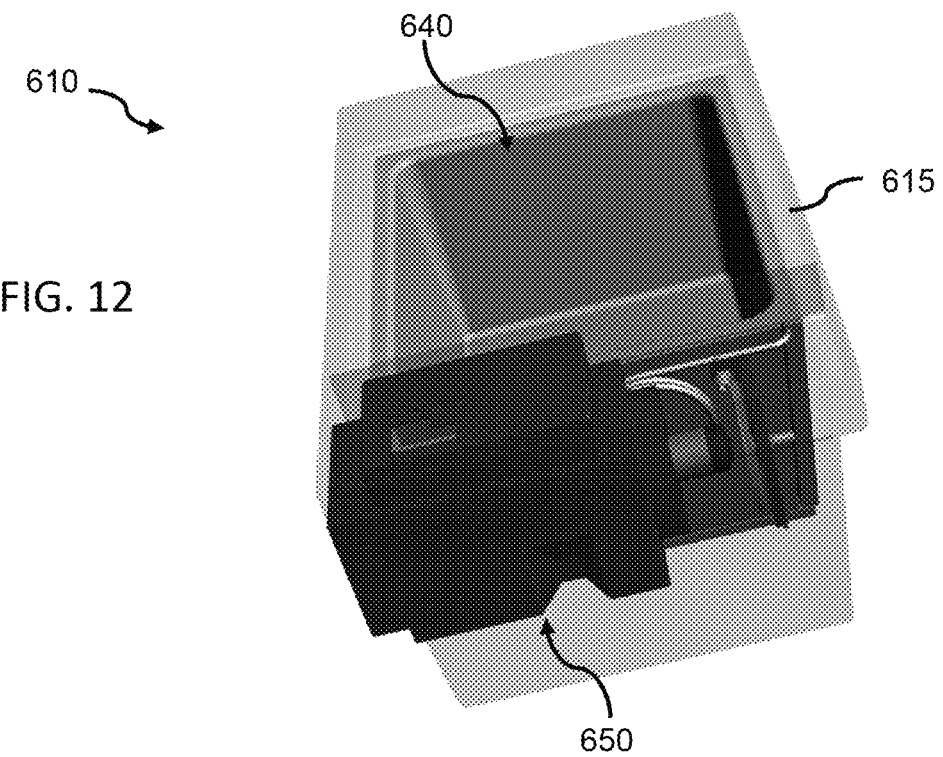
FIG. 12 is a perspective view of another exemplary container including a product space, a refrigeration system, and a control system.
Figure 13:
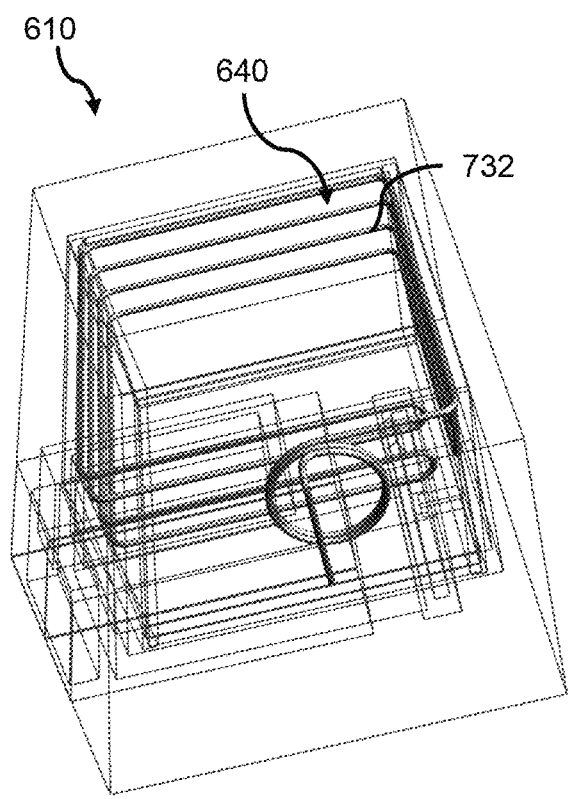
FIG. 13 is a wireframe view of the container of FIG. 12 illustrating refrigerant flow tubes surrounding the product space.

FIGS. 12 and 13 illustrate another exemplary container 610 that may be located in a supermarket, a fulfillment center, or another retail or commercial setting to condition goods or product placed in the container 610. The container 610 is similar to the container 10 and can include any or all of the features of the container 10, even if not specifically labeled or illustrated in FIGS. 12 and 13. Features in FIGS. 12 and 13 that are the same or consistent with those described and illustrated relative to FIGS. 1-8 are numbered in the 600s and 700s.

The container 610 includes a housing 615 that defines an insulated box (e.g., a molded box) and has a wall structure 925 that can take one of the several forms described with regard to FIGS. 1-8. A product space 640 supports product (e.g., food product, non-food product). The housing 615 supports a refrigeration system 650 and a control system 655. The control system 655 is the same as that described with regard to FIGS. 1-8. The illustrated refrigeration system 650 includes a free-piston Stirling engine to circulate refrigerant through evaporator coils 732 that surround the product space 640. Operation of the container 610 is substantially similar to operation of the container 10, except with regard to how refrigerant is circulated through the container 610.

Figure 14:
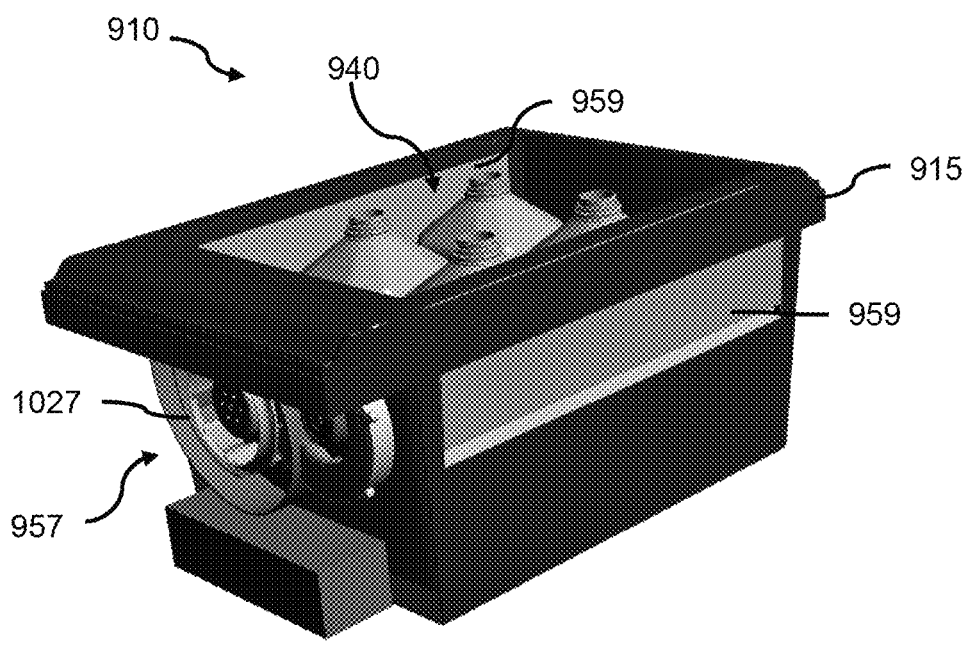
FIG. 14 is a perspective view of another exemplary container including a product space, a refrigeration system, and a control system.
Figure 15:
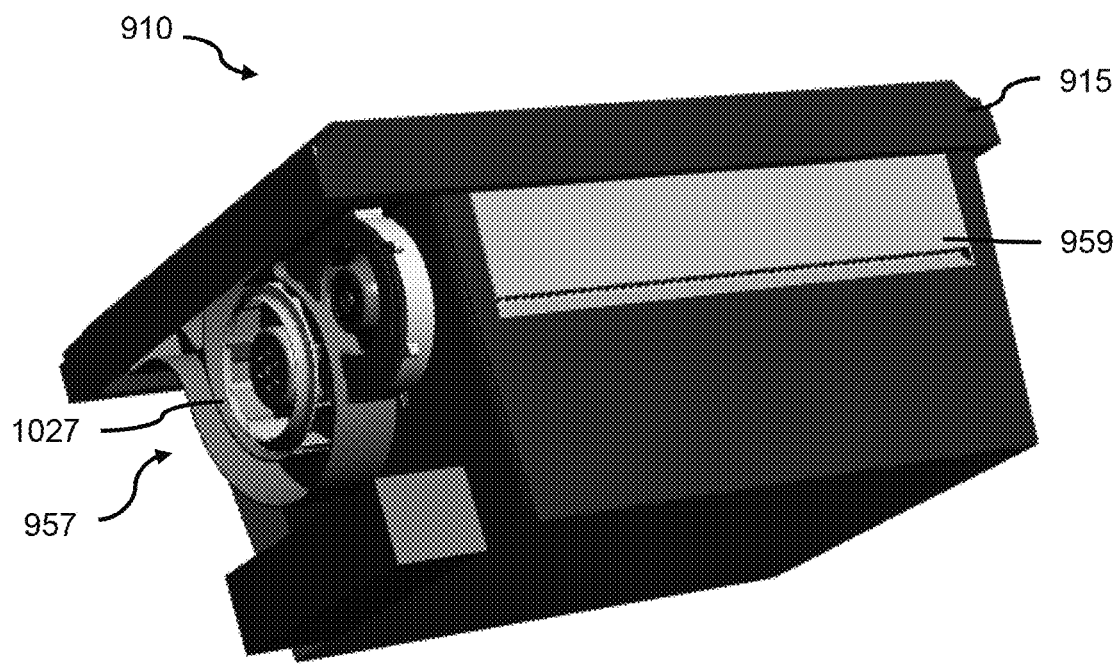
FIG. 15 is another perspective view of the container of FIG. 14.

FIGS. 14 and 15 illustrate another exemplary container 910 that may be located in a supermarket, a fulfillment center, or another retail or commercial setting to condition goods or product placed in the container 910. The container 910 is similar to the container 10 and can include any or all of the features of the container 10, even if not specifically labeled or illustrated in FIGS. 14 and 15. Features in FIGS. 14 and 15 that are the same or consistent with those described and illustrated relative to FIGS. 1-8 are numbered in the 900s and 1000s.

The container 910 includes a housing 915 that defines an insulated box (e.g., a molded box) and has a wall structure 925 that can take one of the several forms described with regard to FIGS. 1-8. A product space 940 supports product (e.g., food product, non-food product). The housing 915 supports a refrigeration system 950 and a control system 955. The control system 955 is the same as that described with regard to FIGS. 1-8. The illustrated refrigeration system 950 has a thermoelectric refrigeration unit 957 (i.e. a Peltier unit) that has thermoelectric plates 959 to condition the product space 940. More specifically, a fan 1027 circulates air to the thermoelectric plates 959 to remove heat, which conditions the product space 940. Operation of the container 910 is substantially similar to operation of the container 10, except with regard to how the product space 940 is conditioned by the refrigeration system 950.

Figure 16:
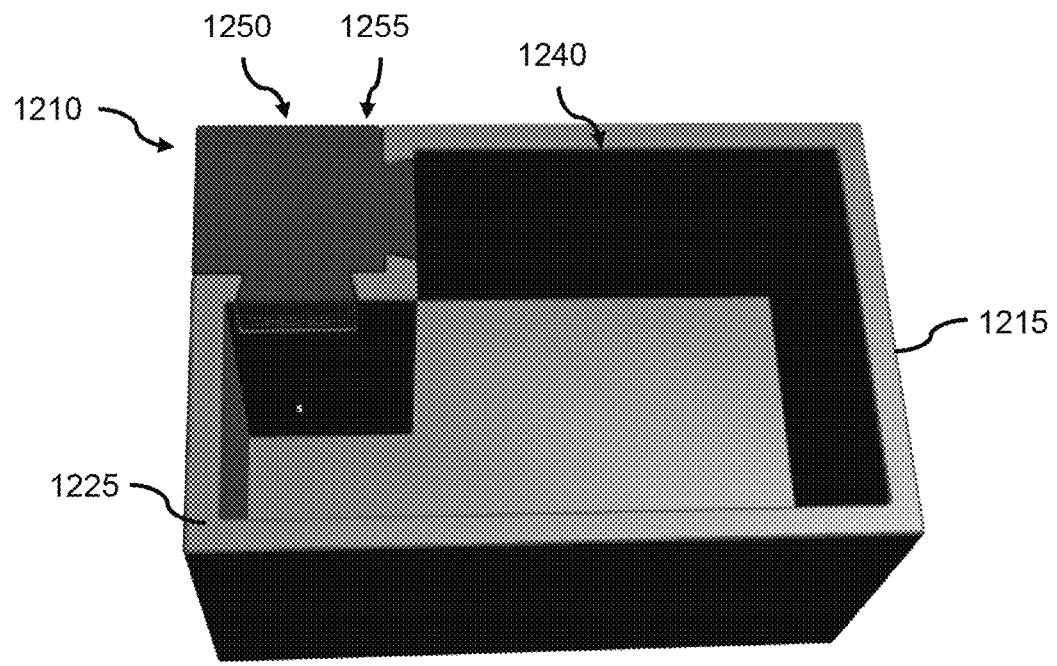
FIG. 16 is a perspective view of another exemplary container including a product space, a refrigeration system, and a control system.
Figure 17:
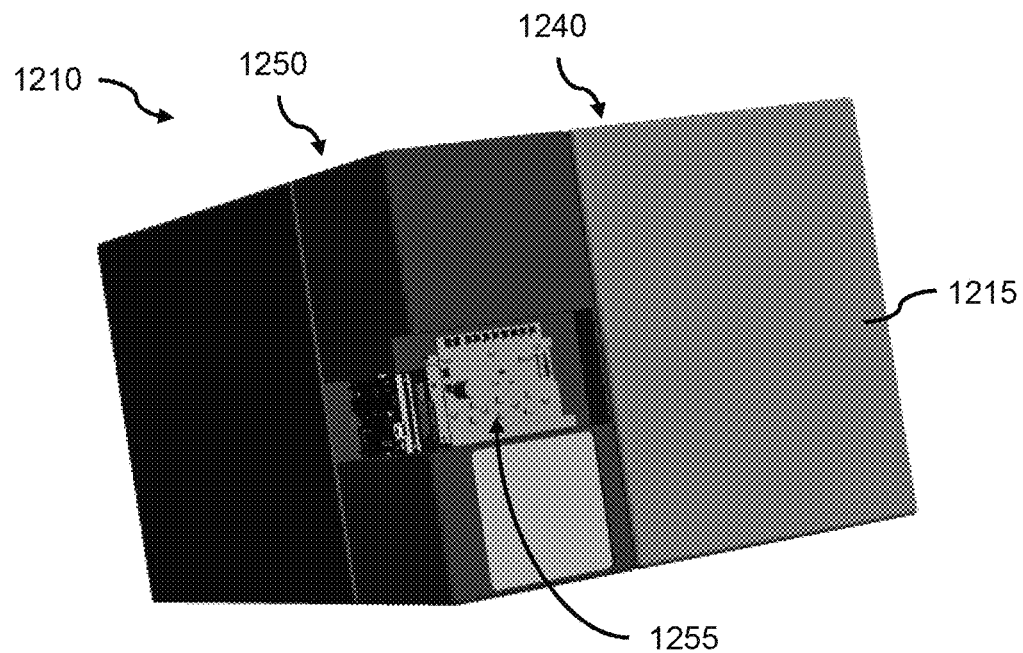
FIG. 17 is another perspective view of the container of FIG. 16.

FIGS. 16 and 17 illustrate another exemplary container 1210 that may be located in a supermarket, a fulfillment center, or another retail or commercial setting to condition goods or product placed in the container 1210. The container 1210 is similar to the container 10 and can include any or all of the features of the container 10, even if not specifically labeled or illustrated in FIGS. 16 and 17. Features in FIGS. 16 and 17 that are the same or consistent with those described and illustrated relative to FIGS. 1-8 are numbered in the 1200s and 1100s.

The container 1210 includes a housing 1215 that defines an insulated box (e.g., a molded box) and has a wall structure 1225 that can take one of the several forms described with regard to FIGS. 1-8. A product space 1240 supports product (e.g., food product, non-food product). The housing 1215 supports a refrigeration system 1250 and a control system 1255. The refrigeration system 1250 and the control system 1255 are substantially similar to the refrigeration system 50 and the control system 55, respectively. The major difference is that the refrigeration and control systems 1250, 1255 are located in a corner of the container 1210 rather than on an entire end. In view of this location, it will be appreciated that the components are micro-components to fit in the smaller area.

The containers described and illustrated herein has multi-temperature control across a wide range of temperatures to facilitate storage and retrieval of product that can be maintained at a desired temperature. Such temperature control is facilitated by the refrigeration system without having to change components of the refrigeration system. The containers are modular and portable, and small enough to fit in spaces at fulfillment centers and in vehicles for transport to desired destinations (e.g., to a locker system, or to a residence or business). The refrigeration system and the control system can be provided on a cassette that can slide into and out of the container, and also be locked in position. While a lid is helpful or useful in low temperature applications, lids may be provided or left off for other temperature applications for the containers. In some embodiments, the control system includes a smart controller that can automate the start/stop of the refrigeration system or other aspects of the container for autonomous or automatic control. In low temperature applications for the container, the control system can implement an automatic defrost and/or adjust flow of air to minimize or remove frost or debris that accumulates on the system.

When the container is implemented in a fulfillment center, the container can be connected to the fulfillment center control (e.g., a server) via one or more of the many ways that the container can be connected (wired or wireless, or a combination thereof). In this manner, the container can keep product at a desired temperature range for an extended period of time until an order or fulfillment process is implemented for retrieval of the product. Similarly, the container may be used to facilitate transfer of product within the fulfillment center or from the fulfillment center to another site while maintaining the desired temperature for the product. In general, containers that are in a fulfillment center or other warehouse can be functionally and communicatively connected to the fulfillment center such that the containers can be individually controlled. In some embodiments, the container can be tracked during movement or shipment (e.g., geo-tracked using Wi-Fi, GPS, or other systems).

Various features and advantages of the invention are set forth in the following claims.

In the foregoing specification and accompanying drawings, one or more embodiments are described and illustrated. These embodiments are not limited to the specific details provided herein and may be modified in various ways. Furthermore, other embodiments may exist that are not described herein. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable media. Similarly, embodiments described herein may be implemented as non-transitory, computer-readable media storing instructions executable by one or more electronic processor to perform the described functionality.

The benefits, advantages, solutions to problems, and any element(s) that may cause any benefit, advantage, or solution to occur or become more pronounced are not to be construed as a critical, required, or essential features or elements of any or all the claims. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Various features and advantages of the invention are set forth in the following claims.

The invention claimed is:

1. A container comprising:
   a housing including a wall defining a product space configured to support product, the housing further including a first compartment and a second compartment each positioned adjacent an outer periphery end of the housing and partially defined by the wall, the first compartment adjacent to and separated from the second compartment by a first plate;
   a power source disposed in the housing and rechargeable via an external source;
   a control system at least partially supported by the housing and including a communication interface, the control system including a processor disposed on or in the housing and in communication with one or more sensors integrated in or on the container to detect factors of the container, the processor configured to store the factors in a memory, the factors including respective threshold crossing events associated with the product space, a refrigeration system, and the power source, the factors further including automatic detection of when the product is placed in or removed from the container, electrical thresholds related to the power source, and a time of an event associated with the container, the time of the event including when the product is placed or removed from the container or when a threshold is reached or crossed; and
   the refrigeration system coupled to the container, the refrigeration system including a compressor, a condenser, and an evaporator fluidly connected to each other, the refrigeration system further including an evaporator fan in airflow communication with the evaporator, and the evaporator in airflow communication with the product space through the wall to selectively condition the product space, the compressor and the condenser positioned within the first compartment, and the evaporator and the evaporator fan positioned within the second compartment,
   wherein the control system is in operative communication with the refrigeration system to selectively and separately condition the product space in each of a low temperature mode, a medium temperature mode, and a high temperature mode,
   wherein the low temperature mode is configured to condition the product space to a temperature between approximately −5° Fahrenheit and 5° Fahrenheit, the medium temperature mode is configured to condition the product in the product space to a temperature between approximately 29° Fahrenheit and 41° Fahrenheit, and the high temperature mode is configured to condition the product in the product space to a temperature above approximately 75° Fahrenheit,
wherein the control system is configured to switch the container between the low temperature mode and the medium temperature mode by operational control of one or both of the compressor and the evaporator fan,
wherein the container including the housing, the refrigeration system, and at least a portion of the control system is modular and portable and configured to fit in spaces at fulfillment centers and in vehicles for transport,
wherein the housing further includes a third compartment separated from the first compartment by a second plate, the first plate separating the second compartment from both the first compartment and the third compartment, and the processor is positioned within the third compartment, and
wherein a blower fan is positioned within the first compartment,
wherein the housing includes a fourth compartment supporting the power source,
wherein each of the first compartment, the third compartment, and the fourth compartment is in airflow communication with the blower fan, and
wherein the first compartment is in airflow communication with the third compartment via openings in the second plate.

2. The container of claim 1, wherein the refrigeration system is further configured to condition the product space in a cool temperature mode in which the product space is configured to be conditioned between approximately 41° Fahrenheit and 71° Fahrenheit.

3. The container of claim 1, wherein the refrigeration system is configured to condition the product space at temperatures between −10° Fahrenheit and 140° Fahrenheit without changing components of the refrigeration system.

4. The container of claim 1, wherein the control system is further configured to regulate the temperature of the product space in the high temperature mode via a change in direction of refrigerant flow via a refrigerant valve.

5. The container of claim 1, wherein the refrigeration system is a vapor compression system having a refrigerant valve that is reversible to switch from either of the low temperature mode and the medium temperature mode to the high temperature mode such that the refrigeration system acts as a heat pump in the high temperature mode.

6. The container of claim 1, further comprising one or more conditioning plates disposed in thermal communication with the product space, wherein the one or more conditioning plates are in thermal communication with the evaporator.

7. The container of claim 1, wherein, in each of the low temperature mode and the medium temperature mode, the control system is configured to implement one or both of an automatic defrost of the refrigeration system or adjust flow of air to minimize or remove frost.

8. The container of claim 1, wherein the time of the event associated with the container includes timing of the threshold crossing event and timing of the automatic detection.

9. A facility comprising:
a plurality of containers, each of the plurality of containers including:
a housing including a wall defining a product space configured to support product, the housing further including a first compartment and a second compartment each positioned adjacent an outer periphery end of the housing and partially defined by the wall, the first compartment adjacent to and separated from the second compartment by a first plate;
a power source disposed in the housing and rechargeable by an external source;
a control system at least partially supported by the housing and including a communication interface and a processor disposed on or in the housing, the control system in communication with one or more sensors integrated in or on the container to detect factors of the container, the processor configured to store the factors in a memory, the factors including:
respective threshold crossing events associated with the product space, a refrigeration system, and the power source;
electrical thresholds related to the power source;
automatic detection of when the product is placed in or removed from the container; and
a time of an event associated with the container, the time of the event including when the product is placed or removed from the container or when a threshold is reached or crossed; and
the refrigeration system coupled to the container, the refrigeration system including a compressor, a condenser, and an evaporator fluidly connected to each other, the refrigeration system further including an evaporator fan in airflow communication with the evaporator, and the evaporator in airflow communication with the product space through the wall to selectively condition the product space, the compressor and the condenser positioned within the first compartment, the evaporator and the evaporator fan positioned within the second compartment,
wherein the control system is in operative communication with the refrigeration system to selectively and separately condition the product space in each of a low temperature mode, a medium temperature mode, and a high temperature mode,
wherein the low temperature mode is configured to condition the product space to a temperature between approximately −5° Fahrenheit and 5° Fahrenheit, the medium temperature mode is configured to condition the product in the product space to a temperature between approximately 29° Fahrenheit and 41° Fahrenheit, and the high temperature mode is configured to condition the product in the product space to a temperature above approximately 75° Fahrenheit,
wherein the control system is configured to switch the container between the low temperature mode and the medium temperature mode by operational control of one or both of the compressor and the evaporator fan,
wherein the container including the housing, the refrigeration system, and at least a portion of the control system is modular and portable and configured to fit in spaces at fulfillment centers and in vehicles for transport, and
wherein the containers are functionally and communicatively connected to the facility via the communication interface such that the containers can be individually controlled,
wherein for each of the plurality of containers, the housing further includes a third compartment separated from the first compartment by a second plate, the first plate separating the second compartment from both the first compartment and the third compartment, and wherein the processor is positioned within the third compartment, and wherein for each of the plurality of containers,
a blower fan is positioned within the first compartment;
the housing includes a fourth compartment supporting the power source,
each of the first compartment, the third compartment, and the fourth compartment is in airflow communication with the blower fan, and
the first compartment is in airflow communication with the third compartment via openings in the second plate.

10. The facility of claim 9, wherein the control system is configured to regulate the temperature of the product space via one or both of a change in a speed or a direction of the evaporator fan and a change in direction of refrigerant flow via a refrigerant valve.

11. The facility of claim 9, wherein the refrigeration system is a vapor compression system having a refrigerant valve that is reversable to switch from either of the low temperature mode and the medium temperature mode to the high temperature mode such that the refrigeration system acts as a heat pump in the high temperature mode.

12. The facility of claim 9, wherein the electrical thresholds relate to power remaining in the power source.

13. The facility of claim 9, wherein, in each of the low temperature mode and the medium temperature mode, the control system is configured to implement one or both of an automatic defrost of the refrigeration system or adjust flow of air to minimize or remove frost.

14. The facility of claim 9, wherein for each of the plurality of containers, the second compartment includes an air inlet and an air outlet, the air inlet is configured to provide airflow communication between the product space and the evaporator fan and the air outlet is configured to provide airflow communication between the evaporator and the product space, wherein the air inlet is positioned at a first height and the air outlet is positioned at a second height that is less than the first height, and wherein the first height and the second height are each closer to a top of the housing than a bottom of the housing.

15. A container comprising:
a housing including a wall defining a product space configured to support product, the housing further including a first compartment and a second compartment each positioned adjacent an outer periphery end of the housing and partially defined by the wall, the first compartment adjacent to and separated from the second compartment by a first plate;
a power source disposed in the housing and rechargeable via an external source;
a control system at least partially supported by the housing and including a communication interface, the control system including a processor disposed on or in the housing and in communication with one or more sensors integrated in or on the container to detect factors of the container, the processor configured to store the factors in a memory, the factors including respective threshold crossing events associated with the product space, a refrigeration system, and the power source, the factors further including automatic detection of when the product is placed in or removed from the container, electrical thresholds related to the power source, and a time of an event associated with the container, the time of the event including when the product is placed or removed from the container or when a threshold is reached or crossed; and
the refrigeration system coupled to the container, the refrigeration system including a compressor, a condenser, and an evaporator fluidly connected to each other, the refrigeration system further including an evaporator fan in airflow communication with the evaporator, and the evaporator in airflow communication with the product space through the wall to selectively condition the product space, the compressor and the condenser positioned within the first compartment, and the evaporator and the evaporator fan positioned within the second compartment, wherein the control system is in operative communication with the refrigeration system to selectively and separately condition the product space in each of a low temperature mode, a medium temperature mode, and a high temperature mode, wherein the low temperature mode is configured to condition the product space to a temperature between approximately −5° Fahrenheit and 5° Fahrenheit, the medium temperature mode is configured to condition the product in the product space to a temperature between approximately 29° Fahrenheit and 41° Fahrenheit, and the high temperature mode is configured to condition the product in the product space to a temperature above approximately 75° Fahrenheit, wherein the control system is configured to switch the container between the low temperature mode and the medium temperature mode by operational control of one or both of the compressor and the evaporator fan, wherein the container including the housing, the refrigeration system, and at least a portion of the control system is modular and portable and configured to fit in spaces at fulfillment centers and in vehicles for transport, wherein the second compartment includes an air inlet and an air outlet, the air inlet is configured to provide airflow communication between the product space and the evaporator fan and the air outlet is configured to provide airflow communication between the evaporator and the product space, wherein the air inlet is positioned at a first height and the air outlet is positioned at a second height that is less than the first height, and wherein the first height and the second height are each closer to a top of the housing than a bottom of the housing, wherein the housing further includes a third compartment separated from the first compartment by a second plate, the first plate separating the second compartment from both the first compartment and the third compartment, and wherein the processor is positioned within the third compartment, and wherein a blower fan is positioned within the first compartment, wherein the housing includes a fourth compartment supporting the power source, wherein each of the first compartment, the third compartment, and the fourth compartment is in airflow communication with the blower fan, and wherein the first compartment is in airflow communication with the third compartment via openings in the second plate.

16. The container of claim 15, wherein the first height and the second height are each greater than a height of the first compartment.

* * * * *